US005560282A

United States Patent [19]

Trenner et al.

[11] Patent Number: 5,560,282

[45] Date of Patent: Oct. 1, 1996

[54] DRIVE FOR TURNING A PINION SHAFT WITH BACKLASH TAKE-UP

[75] Inventors: Albrecht Trenner, Langendorf; Christian Wullschleger, Solothurn, both of Switzerland

[73] Assignee: Montech AG, Derendingen, Switzerland

[21] Appl. No.: 346,372

[22] Filed: Nov. 29, 1994

[30] Foreign Application Priority Data

Dec. 17, 1993 [DE] Germany .......................... 43 43 184.4

[51] Int. Cl.[6] ............................ F15B 15/06; F16H 55/28

[52] U.S. Cl. ................................ 92/136; 74/409; 74/422; 74/109

[58] Field of Search ................................ 92/129, 130 C, 92/131, 136, 138; 74/89.17, 109, 409, 422

[56] References Cited

U.S. PATENT DOCUMENTS 3,179,015 4/1965 Kurt ...................................... 74/409 X
4,627,331 12/1986 Fejes ........................................ 92/129
4,683,805 8/1987 Fejes .................................... 92/138 X
4,884,495 12/1989 Groeneveld .......................... 92/130 C
5,189,923 3/1993 Lashbrook ................................ 74/409

*Primary Examiner*—John E. Ryznic
*Attorney, Agent, or Firm*—Bachman & LaPointe, P.C.

[57] ABSTRACT

A drive for turning a pinion shaft provided with toothed ridges by means of a rack the latter is connected on both sides with pistons, which in each case are held by a cylinder with the formation of a working space which may be acted upon by a pressure medium and closed by a cover or piston. In this case, the rack may be mounted for relative movement with respect to a toothed piston. The rack as well as the toothed piston engage with their teeth the toothed ridges of the pinion shaft.

17 Claims, 6 Drawing Sheets

DRIVE FOR TURNING A PINION SHAFT WITH BACKLASH TAKE-UP

BACKGROUND OF THE INVENTION

The invention concerns a drive for turning a pinion shaft provided with toothed ridges by means of a rack, which is connected on both sides with pistons, which in each case are held in a cylinder with the formation of a working space upon which a pressure medium acts and which may be closed by a cover or piston.

EP-A 0 476 208 concerns an arrangement for turning, for example, workpieces to be finished on a carrier, which may be turned by means of a pinion shaft with toothed ridges via a rack. In this case the rack is to be mounted in a cylinder bore of a housing. It is essential that the distance from teeth and pinion shaft, respectively toothed ridge, may be changed, which is performed by adjusting lateral play of a pin on the rack, against which pin a threaded pin bears. In order to make the adjustment the rotary drive must be stopped, after which manual adjustment is performed by means of a screwdriver or the like.

On the other hand, the task of the present invention is to develop a drive of the above-mentioned type, in the case of which automatic elimination of the play between the teeth of the rack and the toothed ridges of the pinion shaft takes place at least in the end positions.

SUMMARY OF THE INVENTION

The fact that the rack is mounted movable relative to a toothed piston, both rack as well as toothed piston engaging with their teeth into the toothed ridges of the rack, leads to the solution of this task.

Elimination of the play between the teeth and the toothed ridges of the pinion takes place automatically as a result of the relative displacement of the teeth of toothed piston and rack. This takes place during the operation of the rotary drive, that is, without stopping being necessary. Also it is no longer necessary for a person to have access to the drive or for manual adjustment to be performed.

The rack and toothed piston may be arranged around the pinion shaft in any way, but synchronization of the mutual motion is made difficult if they are separated. Therefore in a preferred embodiment the rack is held in a longitudinal hole of the toothed piston, in particular in the middle strip, and guided into corresponding holes of the toothed piston, respectively of the pistons, in each case via a guide bolt.

In this case the guide bolts project over the faces by a specific amount. Thus if the guide bolt strikes a stop, for example a cover closing the cylinder, the guide bolt is pushed into the hole of the toothed piston, respectively the piston, so that there is a displacement of the teeth of the rack with respect to the teeth of the toothed piston. Of course in this way any possible only for the toothed ridges of the pinion shaft already is eliminated only in the end positions.

So that relative motion between rack and toothed piston in the longitudinal hole is possible, faces of the rack are arranged within the longitudinal hole at a variable distance from an inner wall of the longitudinal hole. In the area of this distance the rack may be displaced relative to the toothed piston, the displacement taking place automatically in the case of the movement of the unit of rack and toothed piston, without there having to be a special synchronization to the two motions. The rack is mounted quasi-floating in the toothed piston. The teeth of the rack push against a wall of toothed ridge, the teeth of the toothed piston against the opposite wall of the following toothed ridge, so that the two teeth are in contact with the toothed ridges and play is eliminated.

A further possibility for automatic displacement of the rack with respect to the toothed piston consists in the molding of a stop strip to the rack, respectively to a rod part of this rack. In this way the rack acquires a T-shaped configuration, to which, however the invention is not to be limited. It is essential only that a stop also be associated with this stop strip. This stop holds the stop strip in a predetermined end position, and thus the rack in a specific position, while the toothed piston still can be moved further, for example under the pressure of a pressure medium. Also this leads to a displacement of the teeth of toothed piston and rack.

In the present preferred embodiment a shock absorber is chosen as the stop, the motion of the stop strip bringing it to bear against a push rod of the shock absorber. In this way at the same time the motion of the entire rotary drive is improved significantly and damped, and the play is eliminated by the striking of the stop strip against the push rod.

The front face of the shock absorber itself, from which the push rod projects, forms a stop surface for the stop strip. In this case only the distance between stop and stop strip needs to be changed in order to be able to change an end position, which takes place by means of a displacement or twisting of the shock absorber. However, other possibilities also are conceivable here and are to be covered by the invention.

Further, preferably at least one proximity switch, which, in the case of an adjustment of the stop, also is adjustable, is to be coordinated with the stop and/or the stop strip.

While the just-mentioned embodiment is suited for the specification of two end stops, respectively end positions, in accordance with the invention also it is possible to specify other end positions by means of an intermediate stop. In accordance with the invention this intermediate stop has a tube which for the sake of simplicity is set, in particular screwed, onto the cylinder. In this case an additional piston already slides into the cylinder, which again is connected with a piston rod in the intermediate stop. This piston rod penetrates an intermediate cover which forms a pressure space with the just-mentioned piston. If a pressure medium is introduced into this pressure space, the piston is driven in the direction to the toothed piston, so that the motion of the toothed piston is limited.

A threaded section, onto which an adjustable stop nut is mounted, is provided on the piston rod in order to determine the further end position, respectively in order to limit the stroke motion of the piston from the intermediate stop. This stop nut works together with a corresponding shoulder in the intermediate stop.

In a preferred embodiment an additional drive piston, which form a further pressure space with a cylinder head, is to be attached to the piston rod behind the intermediate cover. The work of the above-mentioned first pressure space is supported essentially by acting upon this pressure space with a pressure medium. A pressure medium feed to both pressure spaces and to the above-mentioned pressure space is performed by means of the piston rod.

In the case of this chosen arrangement, moreover, it is directly possible to supply a pressure medium by means of the pinion shaft to a tool, such as, for example, a gripper, as has been shown already in EP-A 0 476 280.

BRIEF DESCRIPTION OF THE DRAWINGS

Further advantages, features, and details of the invention result from the following description of preferred embodiments as well as by means of the drawing; here

DETAILED DESCRIPTION

Figure 6:
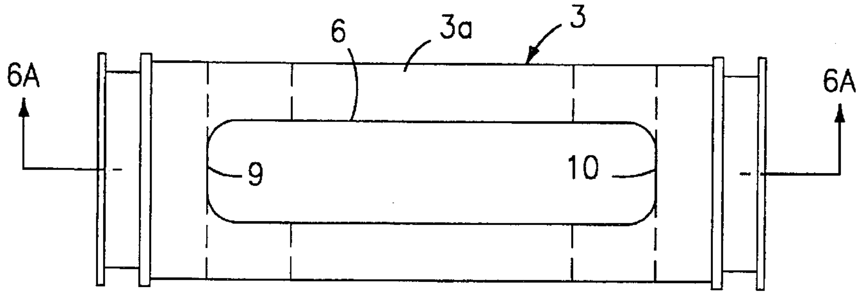
FIG. 6 shows a too view of a toothed piston.

A pinion shaft 2 with toothed ridges is mounted so that it can turn in a housing. A rotation of the pinion shaft 2 in the direction of the double arrow z is performed by means of a toothed piston 3 in cooperation with a rack 4. Toothed piston 3 and rack 4 are mounted perpendicular to an axis of rotation 5 of the pinion shaft 2. In this case the rack 4 rests in a longitudinal hole 6 of a middle part 3*a* of the toothed piston 3, the longitudinal hole 6 being shown in greater detail in FIG. 6.

Rack 4 and toothed piston 3 are mounted so that they can move in the direction of the double arrow x, a relative movability (lost motion) of the toothed piston 3 and rack 4 with respect to one another also being possible. For this reason faces 7 and 8 of the rack 4 in each case on both sides maintain a distance a from a respective inner wall 9, respectively 10, of the longitudinal 6. This distance a is variable in the case of the operation of the combination rack/toothed piston. If the distance a to both sides is equally great, teeth 11, of the toothed piston 3 align with teeth 11 of the rack 4. (see FIGS. 3 and 5) With reference to FIG. 6*a* the teeth 11' of the toothed piston 3 are shown in cross-section.

Moreover the rack 4 is designed T-shaped, a stop strip 13 projecting approximately perpendicularly, about in the middle, being molded onto a rod part 12, which has the above-mentioned teeth. In the operating position this stop strip 13 grips between two push rods 14*a* and 14*b* of shock absorbers 15, both shock absorbers 15 being designed the same, for which reason only one will be described below.

The shock absorber 15 possesses an external thread 16, by means of which it is screwed into a stop sleeve 17. A counternut 18 is screwed onto the shock absorber 15 for fastening. The stop sleeve 17 also has an external thread, with which it is screwed into a part of the housing 1 and is secured against twisting by means of a threaded pin 46. By turning the stop sleeve 17 the stop surface thereof 19 is changed in relation to the stop strip 13 (distance b). This process corresponds to a stroke adjustment of the rack 4 and thus to a change in the angle of rotation of the pinion shaft 2.

A stroke d of the push rod 14*b* is changed by loosening the counternut 18 and turning the shock absorber 15 in the stop sleeve 17. This makes it possible for the kinetic energy absorbed by the shock absorber 15 to be able to be adjusted optimally to the actually existing kinetic energy, formed from the rotating mass attached to the pinion shaft (inertia) and the rotational speed thereof. This possibility of adjustment is of great significance for achieving minimum cycle times.

Figure 2:
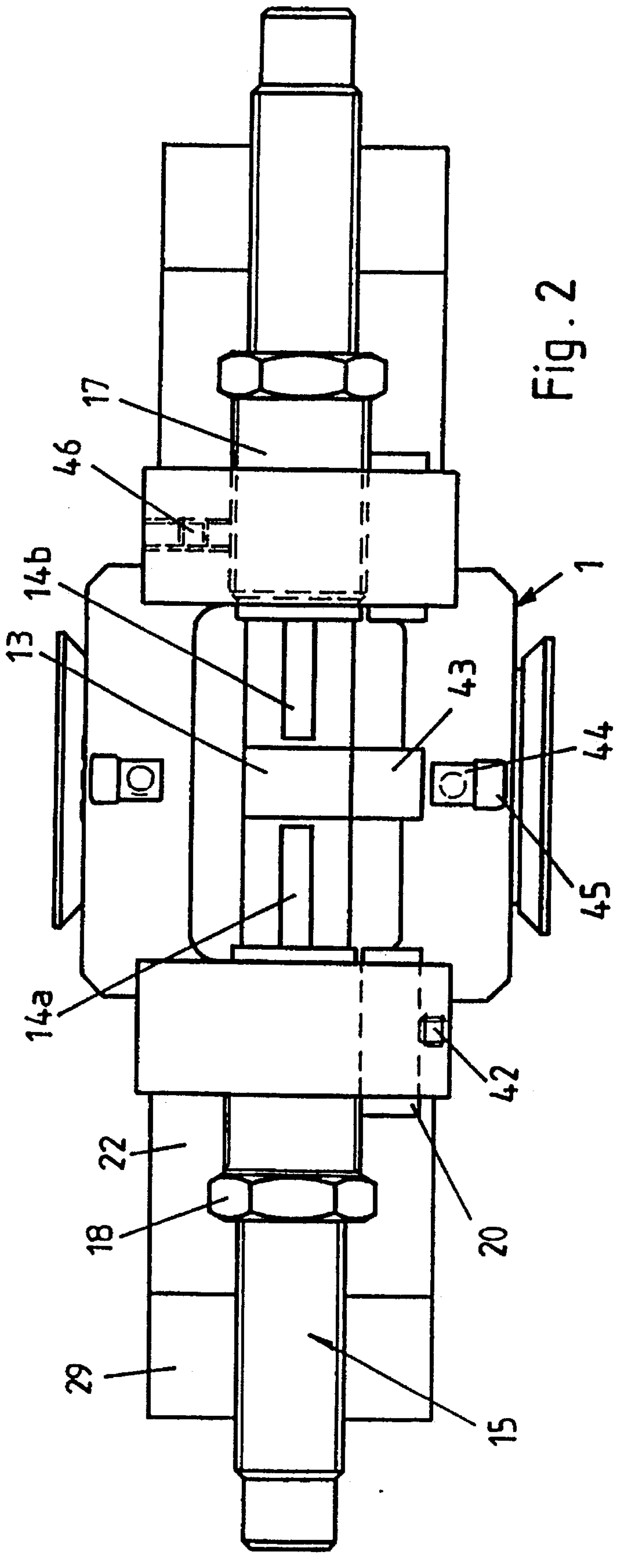
FIG. 2 shows a top view of the rotary drive in accordance with FIG. 1.

In addition to the shock absorber 15 the housing also contains a receptacle 20 for a proximity switch. FIG. 2 shows that the proximity switch is axially adjustable in the receptacle. This is performed by loosening, respectively tightening a stud screw 42. Since the stop strip 13, which works together with the push rods 14*a* and 14*b*, moves outside of the area of recognition of the proximity switch, a cube 43 also is associated with the stop strip 13.

In addition the area between the two shock absorbers 15 is covered by a cover 21. The two opposite shackles 44 and the screws 45 serve for fastening the cover.

In each case a cylinder 22 for receiving a piston 23 of the toothed piston 3 is inserted into the housing 1. The piston 23 in this case forms with a cover 24 a working space 25, the volume of which is variable. For this purpose the cover 24 has an axial hole 26 to letting a pressure medium into the working space 25.

The cover 24 also has a ring flange 27, with which it rests on a ring edge 28 of the cylinder 22 and is held clamped there by means of a union nut.

A piston cover 30 is set on each piston 23 on the front side and is held there by means of a screw 31. In this case a sealing ring 33 is held in a ring groove formed between the piston cover 30 and piston 23. This sealing ring 33 performs a sealing with respect to working space 25, while a guide ring 34, which serves for guiding the piston 23 within the cylinder 22, follows the sealing ring 33.

An axis-parallel hole with which a corresponding hole in the piston cover 30 aligns, is made in each piston 23. A guide bolt 37 is mounted so that it can slide into the holes 35 and 36, the guide bolt 37 being supported against the hole 35 via guide rings 38 and 39 with the interposition of a sealing ring 40. Each guide bolt 37 is inserted into a stepped hole 41 in the rod part 12 of the rack 4, corresponding threads acting together.

Figure 3:
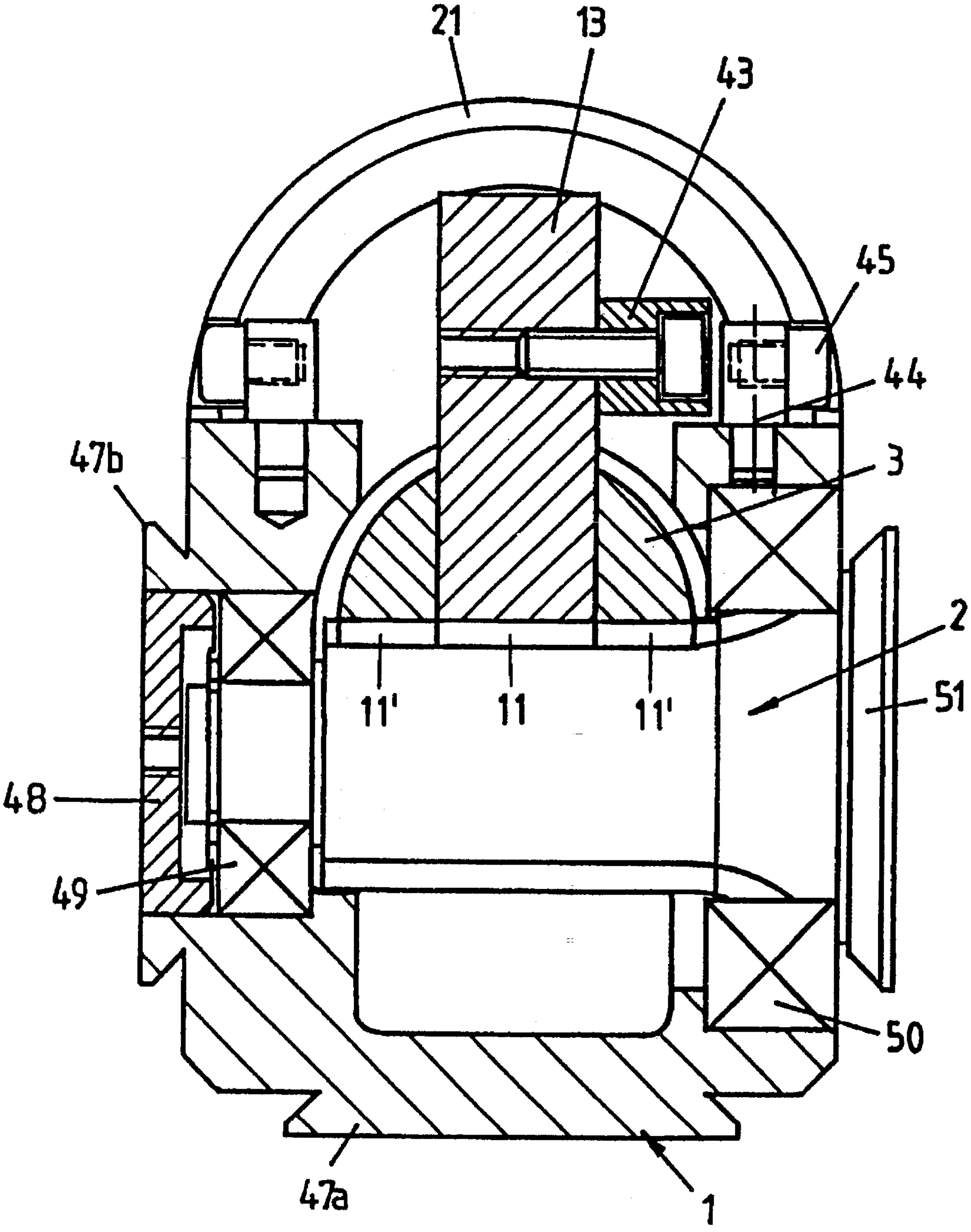
FIG. 3 shows a cross-section through the rotary drive as shown in FIG. 1 along line III—III.

FIG. 3 shows that the housing 1 has two swallow tails 47*a* and 47*b* for fastening the rotary drive. A cover 48, which covers a bearing 49 for the pinion shaft 2, is inserted into the swallowtail 47*b*. This is received on the other side in a further position 50. There also a conical plate 51 is connected to the pinion shaft 2 for fastening a tool or the like.

Figure 1:
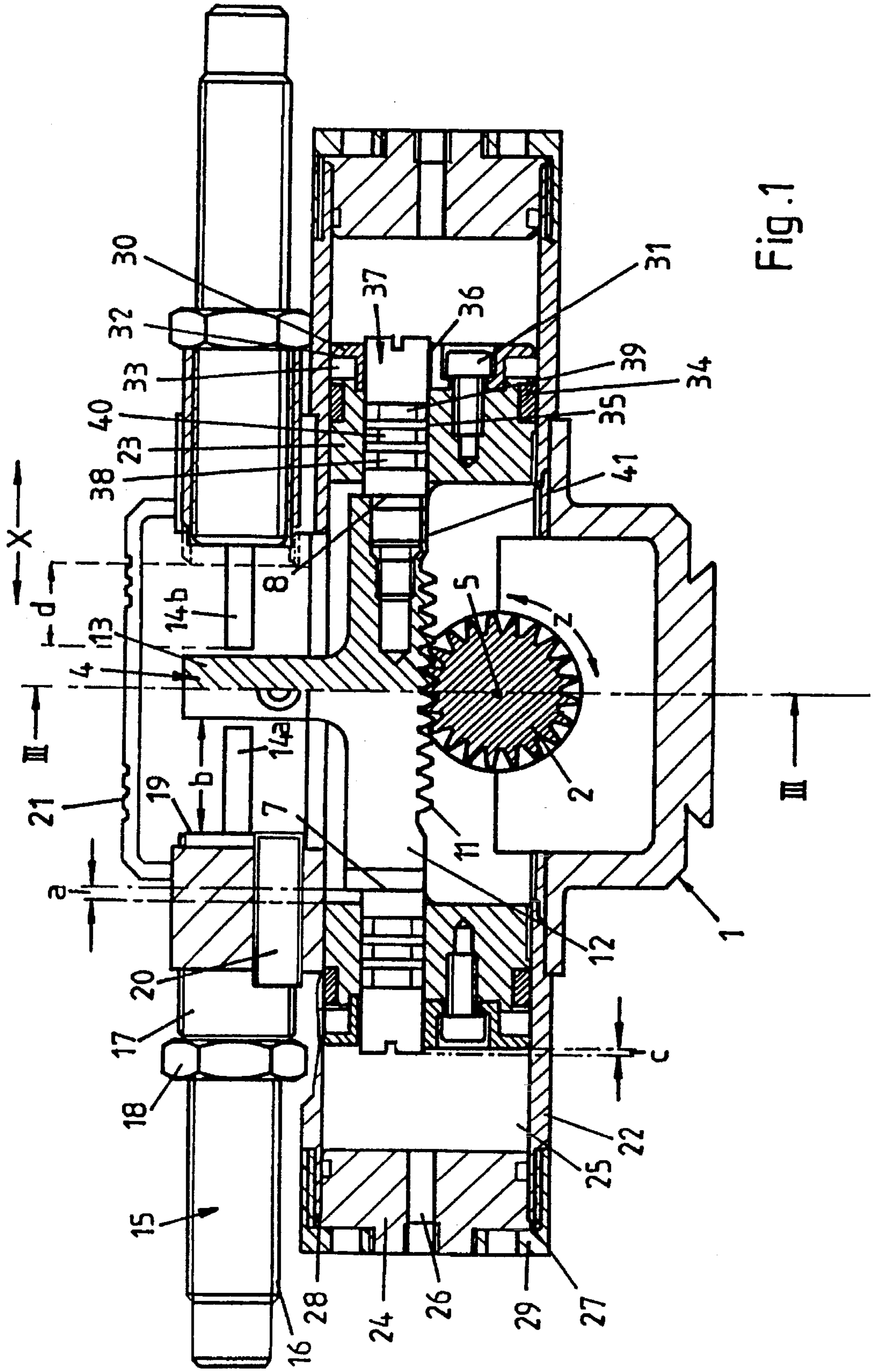
FIG. 1 shows a longitudinal section through a rotary drive in accordance with the invention.

The mode of operation of the present invention is as follows:

For example, if the pinion shaft 2 is to be turned counterclockwise in the direction of rotation z, rack 4 and toothed piston 3 in FIG. 1 must move to the left. That is, the working space 25 on the right side is brought under pressure so that the unit of toothed piston 3 and rack 4 move to the left.

During this motion the stop strip 13 strikes the push rod 14*a* of the shock absorber 15. In this way the rack 4 is held against the direction of advance of the toothed piston 3 so that the distance a between the face 8 and the inner wall 10 is reduced. In other words, the piston continues to move relative to the rack. The two guide bolts 37 project out over the face of the piston cover 30 an amount c which never becomes 0 (zero).

Any play between the rack/toothed piston combination and the pinion shaft 2 is eliminated by the offset of the teeth of toothed piston and rack.

The above-mentioned proximity switches give the electronic control a signal as soon as the stop strip 15 reaches one of the two stop surfaces 19.

Figure 4:
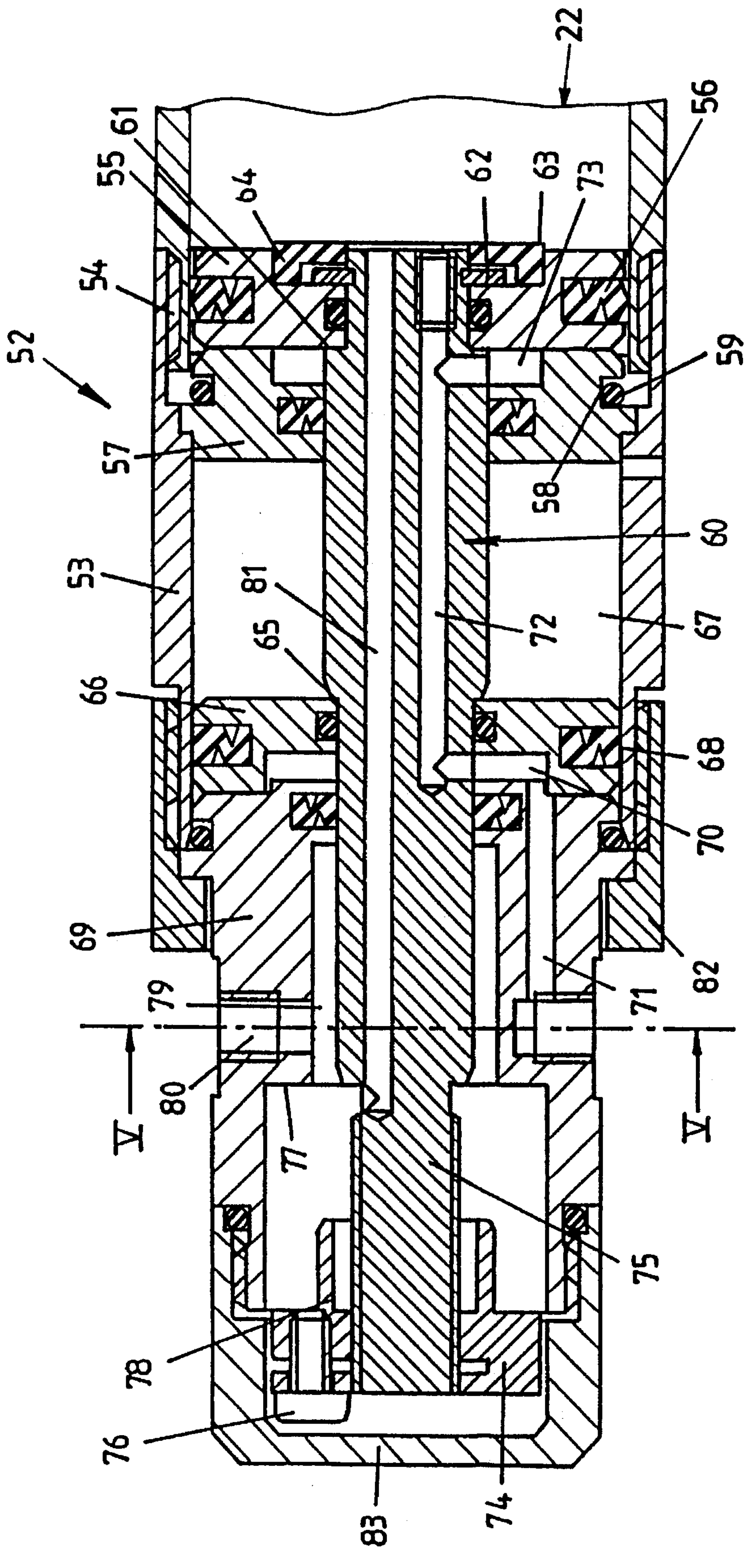
FIG. 4 shows a longitudinal section by means of an intermediate stop in accordance with the invention for a rotary device.

FIG. 4 shows an intermediate stop 52 in accordance with the invention, with which, in each case when an intermediate stop 52 is inserted in each case into a cylinder 22 beside the two end positions of the pinion shaft, which result from guiding the stop strip 13 onto the stop surfaces 19, an intermediate position also can be approached, which is produced as a result of the guide bolt 37 striking the cushion 64, if the piston 55 projects into the cylinder 22 by an adjustable amount.

The union nut 29 is removed in order to set the intermediate stop 52 on the cylinder 22. Instead of this a pipe 53 with an internal thread 54 is screwed to the cylinder 22. A piston 55 also slides into the cylinder 22, from which the cover 24 also is removed, at the time of screwing the pipe to the cylinder.

Peripherally this piston 55 has a corresponding piston gasket 56, which seals the piston with respect to the cylinder wall. Now an intermediate cover 57 takes the place of the cover 24. This intermediate cover bears a corresponding ring gasket 59 for the cylinder 22 in a ring groove 58.

A piston rod 60, which is made in steps, passes through the intermediate cover 57. In the front area the piston 55 is supported against a stop shoulder 61 and is fastened by means of a securing ring 62. Another cushion 64 is inserted into a front recess 63 of this piston 55.

After the intermediate cover 57 the piston rod forms a further shoulder 65, to which a drive piston connects. This drive piston 66 slides in a working space 67 within the tube 53 and possesses a corresponding piston gasket 68.

The drive piston, 66 together with a cylinder head 69 forms a pressure space 70, which can be fed with a pressure medium by a line through the cylinder head 69. Further the pressure space 70 is connected via an axial hole 72 within the piston rod 60 with a front pressure space 73 between the intermediate cover 57 and the piston 55. In the case of feeding pressure medium through the supply line 71 the piston 55 is driven into an end position for determining a further end stop for the toothed piston 3, because of the simultaneous pressure build up in pressure spaces 70 and 73 the force on the piston 55 being approximately twice as high as that which can be generated by the piston 23.

Mounting the intermediate stop 52 on the cylinder tube 22 eliminates the cover 24 together with the compressed air intake 26. In this case the pressure medium is fed into the working space 25 through the intake 80, the blind recess 79, as well as the longitudinal hole 81.

The depth of penetration of the piston 55 into the cylinder 22 is limited by a stop nut 74, which is screwed to a threaded section 75 of the piston rod 60 on the other side of the piston 55. A clamp screw 76 serves for the clamping attachment of the union nut 74 in a desired position on the threaded section 75.

Moreover, the stop nut 74 acts together with a stop shoulder 77 in the cylinder head 69, a sleeve anchor plate 78, which can engage in a blind recess 79 in the cylinder head 69, also being molded to the stop nut 74. In this case it activates an inductive proximity switch (not shown), the axis of which has the same position as the compressed air intake 80, but is mounted offset by 90° to the latter. The proximity switch gives the electronic control a signal when the piston 55 has reached its end position projecting into the cylinder 22.

A further union nut 82 serves for holding the cylinder head 69 to the pipe 53. By means of this arrangement the two threaded holes may be turned into any position for feeding the compressed air in the cylinder head 69. Further, a cap 83, which provides for easy accessibility for adjusting the stop nuts 74 on the threaded section 75, is mounted on the end of the cylinder head 69.

The greatest adjustable angle of rotation of the pinion shaft 2 results from bringing the stop strip 13 to bear against the stop surfaces 19, when the stop sleeves 17 are in their outermost operating position. In this case the guide bolt 37 never touches the cover 24 The play between the rack 4, the pinion shaft 2, and the toothed piston 3 is eliminated, for example, by shifting the toothed piston to the left so that both the shock absorber push rod **14*a* as well as the stop surface 19 work against the direction of motion of the rack 4 via the stop strips 13** thereof.

Since the engaged teeth of the pinion shaft 2 now are stressed from the right as well as from the left, the play existing between the teeth is adjusted to zero automatically. In the case of using the intermediate stop 52 the piston 55 with the cushion fastened to it projects into the working space 25, when the chambers 70 and 73 are filled with the pressure medium. Now if the toothed piston 3 is displaced to the left in this state, the shock absorber push rod **14*a* acts against the direction of motion of the rack 4 over a part of the distance b, but the motion ends only when the guide bolt 37 lies on the absorber 64**. With this, as described above, the play between the teeth again is readjusted to zero automatically.

Figure 5:
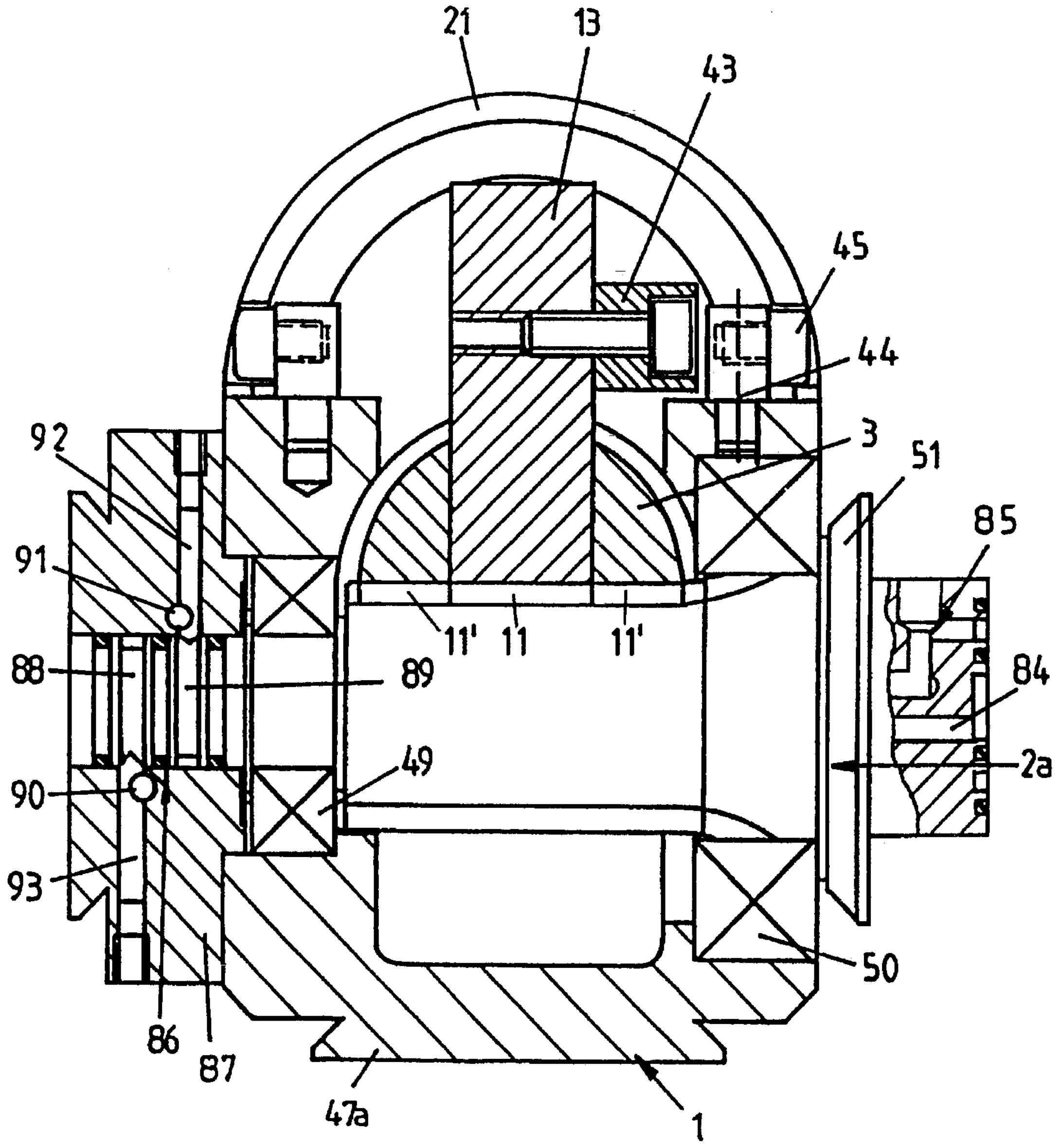
FIG. 5 shows a cross-section through a further embodiment of a rotary drive in accordance with FIG. 3.
Figure 6A:
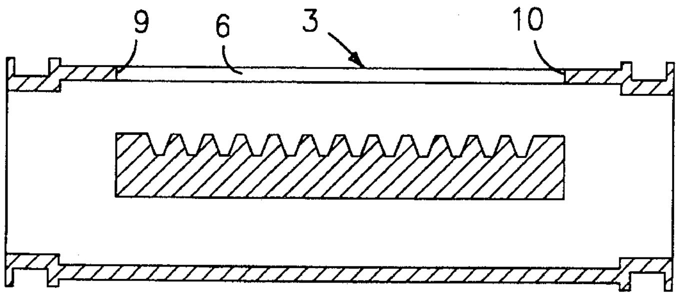
FIG. 6*a* is a cross-section through the toothed piston.
Figure 7:
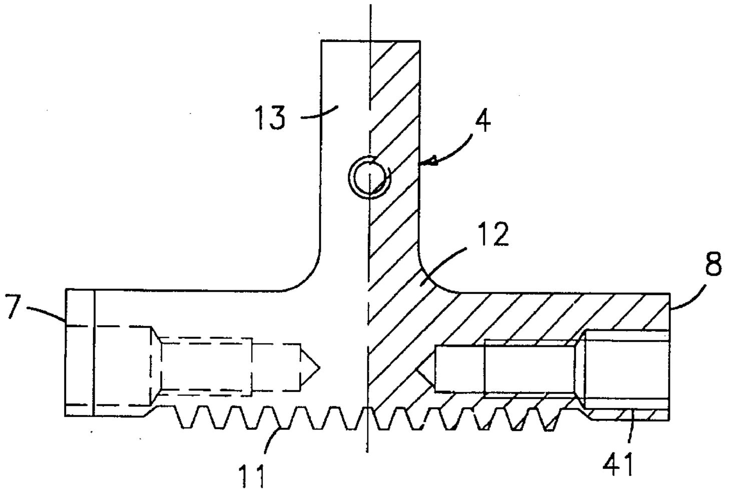
FIG. 7 shows a side view of a rack partially presented in cross-section.

The embodiment of a rotary drive shown in FIG. 5 differs from that shown in FIG. 1 only in an internal air feed through the pinion shaft **2*a*** to a tool, not shown in greater detail, operated with a pressure medium. For example, this may be a gripping device.

Two lines 84 and 85, mounted approximately axis-parallel, are located in the pinion shaft **2*a* for the purpose of supplying the pressure medium, the line 85 running somewhat bent. On the other side of the plate 51 and behind the bearing 49 the pinion shaft 2*a* engages in a connecting piece 87 and is guided sealed there. Several peripheral grooves are molded into the shaft section 86, two grooves 88 and 89 in each case being connected with the lines 84, respectively 85, by means of corresponding radial holes. Further in each case lines 90 and 91, through which the pressure medium can be brought into correspondingly closed radial holes 92 and 93, and via these also into the grooves 88 and 89, are associated with the grooves 88 and 89**.

In each case the grooves 88 and 89 are bordered laterally with further grooves with ring gaskets.

We claim:

1. In a fluid control rotary actuator for turning a pinion shaft having a toothed surface comprises:

a cylinder;

a hollow piston mounted in said cylinder, said hollow piston having opposed end faces connected together by a cylindrical sidewall, portion, said cylindrical sidewall portion having an internal surface provided with teeth means for engaging the toothed surfaces of the pinion shaft;

rack means associated with said hollow piston so as to provide a lost motion connection therebetween, said rack means having teeth means for engaging said toothed surface of the pinion shaft; and means for reciprocating said piston within said cylinder in a first direction to a first end joint and in a second direction opposite said first direction to a second end joint for turning the pinion shaft in a clockwise and counter-clockwise direction wherein said rack is moved with said piston as said piston moves in said first direction and said second direction and said piston is displaced relative to said rack as said piston approaches said first end joint and said second end joint.

2. An actuator according to claim 1 wherein said rack is mounted within said hollow piston.

3. An actuator according to claim 2 wherein the opposed end faces of said hollow piston are provided with through bore holes and said rack is provided with a pair of opposed projections which are received within said through bore holes.

4. An actuator according to claim 3 wherein each of said opposed projections extends into said cylinder lug and the opposed end faces of said hollow piston a distance c.

5. An actuator according to claim 2 wherein said hollow piston is provided with a longitudinal opening having a pair of inner walls and said rack has a pair of inner faces each a variable distance a from one of said pair of inner walls.

6. An actuator according to claim 5 wherein said rack includes abutment means which projects out of said hollow piston through said longitudinal opening for abutting at least one stop means.

7. An actuator according to claim 6 wherein said at least one stop means includes shock absorber wherein said abutment means abuts a push rod of said shock absorber during reciprocal motion of said rack.

8. An actuator according to claim 7 including means for adjusting the position of the at least one stop means.

9. An actuator according to claim 8 wherein said at least one stop means further includes an axially adjustable proximity switch.

10. An actuator according to claim 6 wherein said at least one stop means includes an intermediate stop.

11. An actuator according to claim 10 wherein the intermediate stop includes a piston-cylinder arrangement.

12. An actuator according to claim 11 wherein the piston is connected with a piston rod which passes through an intermediate cover of the at least one stop means, said cover forms a pressure space with the piston.

13. An actuator according to claim 12 wherein a threaded section is molded onto the piston rod on the other side of the piston and an adjustable stop nut is located on the threaded section.

14. An actuator according to claim 13 wherein a drive piston which forms a further pressure space with a cylinder head is set on the piston rod behind the intermediate cover.

15. An actuator according to claim 14 wherein both pressure spaces are connected with a pressure medium source via a supply line as well as a longitudinal hole in the piston rod.

16. An actuator according to claim 15 wherein a further longitudinal hole passes through the piston rod in order to supply pressure medium to the working space.

17. An actuator according to claim 1 wherein a pressure medium feed is provided in the pinion shaft.

* * * * *